(No Model.)

S. J. MORGAN.
COW TAIL HOLDER.

No. 424,016. Patented Mar. 25, 1890.

Witnesses
David P. Wolhaupter
W. S. Sewall

Inventor
S. John Morgan.
By his Attorneys,
C. A. Snow & Co.

UNITED STATES PATENT OFFICE.

SIDNEY JOHN MORGAN, OF ORNEVILLE, MAINE.

COW-TAIL HOLDER.

SPECIFICATION forming part of Letters Patent No. 424,016, dated March 25, 1890.

Application filed August 29, 1889. Serial No. 322,309. (No model.)

*To all whom it may concern:*

Be it known that I, SIDNEY JOHN MORGAN, a citizen of the United States, residing at Orneville, in the county of Piscataquis and State of Maine, have invented a new and useful Cow-Tail Holder, of which the following is a specification.

This invention has relation to cow-tail holders of that class adapted to couple the tail of the cow to its hind leg, and among the objects in view are to provide an extremely cheap and simple holder of the above character, which is quickly attached and detached, is strong, serviceable, and efficient.

With these general objects in view the invention consists in the construction of a holder of a single piece of spring-wire, bent near its center to form a coil, extended to form a tail-receiving loop, and again bent to form a leg-receiving loop and terminating in interlocking ends.

Figure 1:
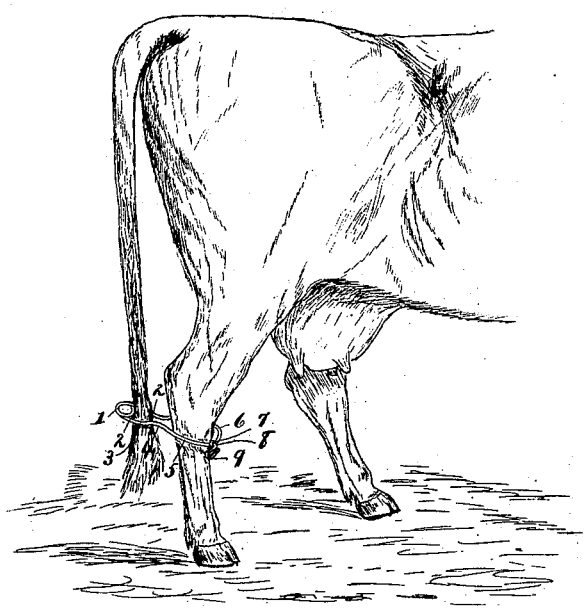
Figure 2:
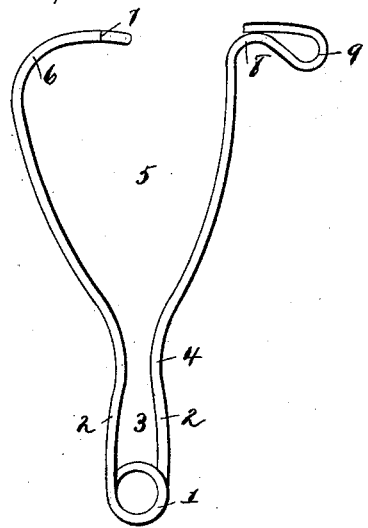
Figure 3:
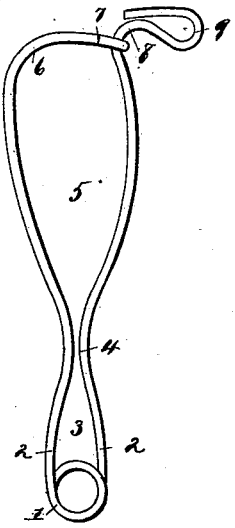

Referring to the drawings, Figure 1 is a general view of a cow, the tail of the same being coupled to its leg by a holder or coupler constructed in accordance with my invention. Fig. 2 is a plan view of the holder detached, the same being open; and Fig. 3, a similar view, the same being closed.

Like numerals of reference indicate like parts in all the figures of the drawings.

In practicing my invention I employ a blank of spring-wire of suitable strength and resiliency for the purpose in view, and bend the same near its center to form one or more coils 1 and opposite spring-arms 2. After forming the coil 1 the spring-arms are converged, forming a loop 3 for the reception of the cow's tail, and are then diverged, as at 4, to form a leg-receiving loop 5. One of the arms 2 is bent inwardly, as at 6, to form a hook 7, and the opposite terminal is bent to form an eye 8 for engaging the hook, and is then continued outwardly to form an operating-arm 9.

To apply the holder, the same is taken in an open position, as shown in Fig. 2, and the cow's tail slipped within the loop 3, and the arms are clasped around the leg of the animal and compressed until the hook of one arm engages the eye of the other. To disengage the attachment, the arm projecting outwardly from one of the terminals 2 is compressed until the hook is beyond a plane therewith, and the attachment may be readily removed.

Having described my invention, what I claim is—

The herein-described cow-tail holder formed of a single piece of spring-wire coiled, as at 1, intermediate its ends and forming opposite terminals, said terminals being outwardly spread, as at 2, and converged, as at 4, forming a tail-receiving loop, and again spread to form a larger leg-receiving loop 5, one of said terminals being bent to form an eye 8 and terminating beyond its eye in an operating-arm 9, and the other terminal terminating in a hook 7 for engaging the eye, substantially as specified.

In testimony that I claim the foregoing as my own I have hereto affixed my signature in presence of two witnesses.

S. JOHN MORGAN.

Witnesses:
IOLA A. MORGAN,
M. W. MORGAN.